United States Patent
Medenica et al.

(10) Patent No.: US 10,150,410 B2
(45) Date of Patent: Dec. 11, 2018

(54) APPARATUS AND METHODS FOR PROVIDING VEHICLE DRIVING INFORMATION

(71) Applicant: Honda Motor Co., Ltd., Tokyo (JP)

(72) Inventors: Zeljko Medenica, Southfield, MI (US); Shigenobu Saigusa, Westbloomfield, MI (US); Yutaka Kamata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/386,868

(22) Filed: Dec. 21, 2016

(65) Prior Publication Data

US 2018/0170256 A1 Jun. 21, 2018

(51) Int. Cl.
*B60Q 9/00* (2006.01)
*B60R 16/023* (2006.01)
*B60R 16/037* (2006.01)

(52) U.S. Cl.
CPC ............ *B60Q 9/00* (2013.01); *B60R 16/0231* (2013.01); *B60R 16/037* (2013.01)

(58) Field of Classification Search
CPC .............................. B60R 16/0231; B60Q 9/00
USPC ........................................................ 340/439
See application file for complete search history.

(56) References Cited

U.S. PATENT DOCUMENTS

| | | | | |
|---|---|---|---|---|
| 6,438,472 | B1 * | 8/2002 | Tano | G01C 21/26 701/25 |
| 2008/0120025 | A1 * | 5/2008 | Naitou | G01C 21/12 701/33.7 |
| 2010/0209890 | A1 * | 8/2010 | Huang | G09B 9/05 434/65 |
| 2011/0065490 | A1 * | 3/2011 | Lutnick | G07F 17/32 463/16 |
| 2014/0303833 | A1 * | 10/2014 | Phelan | G06Q 40/00 701/31.5 |
| 2015/0057883 | A1 * | 2/2015 | Kelly | G05B 19/042 701/36 |
| 2015/0199162 | A1 * | 7/2015 | Platz | G08G 1/0112 701/1 |
| 2015/0235483 | A1 | 8/2015 | Strobel | |
| 2015/0262484 | A1 * | 9/2015 | Victor | G09B 19/16 701/1 |
| 2016/0009296 | A1 | 1/2016 | Iguchi et al. | |
| 2016/0046296 | A1 * | 2/2016 | Offenhaeuser | B60R 16/037 701/24 |
| 2016/0171885 | A1 * | 6/2016 | Lynch | G08G 1/0129 701/117 |
| 2018/0067486 | A1 * | 3/2018 | Yako | B60W 50/08 |

FOREIGN PATENT DOCUMENTS

JP 2008-261703 A 10/2008

* cited by examiner

*Primary Examiner* — Kerri L McNally
(74) *Attorney, Agent, or Firm* — Kenealy Vaidya LLP

(57) ABSTRACT

An information providing system for a vehicle is provided. The vehicle is operable by a driver capable of exhibiting driving behavior, the driving behavior being a recorded frequency of occurrences. The system can include a processor that is configured to: obtain a first driving pattern from the driving behavior, the first driving pattern being specified when the same driving behavior is repeated above a threshold frequency; select at least one functionality based on the first driving pattern obtained; and recommend the at least one functionality selected by the selector to the driver.

26 Claims, 10 Drawing Sheets

|  | DAY 1 | DAY 2 | DAY 3 |
|---|---|---|---|
| DRIVING ON HIGHWAY | ○ | ○ | ○ |
| PARKING IN A NARROW SPOT |  | ○ | ○ |
| UNLOCK ALL DOORS BY PRESSING REMOTE UNLOCK BUTTON TWICE |  | ○ |  |
| OTHER(S) |  |  |  |

FIG. 5

|  | USE HISTORY | LAST USE |
|---|---|---|
| LKAS | NEVER USED BEFORE |  |
| ACC | USED BEFORE | TODAY |
| PARK ASSIST | USED BEFORE | TODAY |

FIG. 6

|  | LKAS | ACC | PARKING ASSIST | UNLOCK ALL DOORS BY PRESSING UNLOCK BUTTON ONCE |
|---|---|---|---|---|
| HIGHWAY | SUITABLE | SUITABLE |  |  |
| NARROW PARKING SPOT |  |  | SUITABLE |  |
| UNLOCK ALL DOORS BY PRESSING REMOTE UNLOCK BUTTON TWICE |  |  |  | SUITABLE (POTENTIAL FOR SIMPLIFICATION) |
| OTHER(S) |  |  |  |  |

FIG. 8

| USER A | DAY 1 | DAY 2 | DAY 3 |
|---|---|---|---|
| DRIVING ON HIGHWAY | ○ | ○ | ○ |
| PARKING IN A NARROW SPOT | | ○ | ○ |
| UNLOCK ALL DOORS BY PRESSING REMOTE UNLOCK BUTTON TWICE | | ○ | |
| OTHER(S) | | | |

FIG. 12A

| USER B | DAY 1 | DAY 2 | DAY 3 |
|---|---|---|---|
| DRIVING ON HIGHWAY | | | |
| PARKING IN A NARROW SPOT | ○ | ○ | ○ |
| UNLOCK ALL DOORS BY PRESSING REMOTE UNLOCK BUTTON TWICE | | | |
| OTHER(S) | | | |

FIG. 12B

| USER B | DAY 1 | DAY 2 | DAY 3 |
|---|---|---|---|
| DRIVING ON HIGHWAY | | | |
| PARKING IN A NARROW SPOT | | | |
| UNLOCK ALL DOORS BY PRESSING REMOTE UNLOCK BUTTON TWICE | ○ | ○ | ○ |
| OTHER(S) | | | |

FIG. 12C

APPARATUS AND METHODS FOR PROVIDING VEHICLE DRIVING INFORMATION

BACKGROUND

The disclosed subject matter is directed to apparatus and methods for providing vehicle driving information. More particularly, the disclosed subject matter is directed to methods and apparatus for enhancing driver familiarity with unused functionalities.

Many types of vehicles include functionalities which provide drivers and passengers with additional performance features for the vehicle, such as adaptive cruise control (ACC), lane keeping assist system (LKAS), etc. However, vehicle operators may not be aware of the functionalities offering additional performance features for the vehicle. This unawareness can result in vehicle operators forgoing activation of these functionalities (e.g., not activating these functionalities such as by forgetting or not realizing), particularly in situations in which vehicle performance would be enhanced from the additional performance features. By operating the vehicle without these functionalities, the operators may not experience the enhanced performance that the vehicle is capable of.

Vehicle information systems, particularly information providing systems that recommend features to a driver based on traveling environment and history of the driver's use of the features, promote driver familiarity with unused functionalities.

SUMMARY

According to one aspect, an information providing system for a vehicle is provided. The vehicle is operable by a driver capable of exhibiting driving behavior, the driving behavior being a recorded frequency of occurrences. The system can include a processor that is configured to: obtain a first driving pattern from the driving behavior, the first driving pattern being specified when the same driving behavior is repeated above a threshold frequency; select at least one functionality based on the first driving pattern obtained; and recommend the at least one functionality selected by the selector to the driver.

According to another aspect, a method of providing information for a vehicle, the method comprising: obtaining a first driving pattern from a driving behavior, the first driving pattern being specified when the same driving behavior is repeated above a threshold frequency; selecting at least one functionality based on the first driving pattern; and recommending the functionality to a driver, wherein the first driving pattern is specified when the same driving behavior is repeated more than threshold.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a table of exemplary first driving patterns.

FIG. 6 is a table of exemplary second driving patterns.

FIG. 8 is a table showing exemplary suitable functions.

FIG. 12A is a table demonstrating individual driving pattern information for User A.

FIG. 12B is a table demonstrating individual driving pattern information for User B.

FIG. 12C is a table demonstrating individual driving pattern information for User C.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Some feature recommendation systems for vehicles suggest unused vehicle functionalities (ACC, LKAS, etc.) to a driver based on driving patterns of other users. This means recommended functionality may not be what the present driver really wants, which may be a nuisance and inefficient if the driver has to then search for desirable functionality. Additionally, these related art systems may also suggest unused functionality while driving that the driver has no interest in activating.

A need was identified for an effective information providing system capable of teaching and coaching a driver to activate vehicle functions through intelligent recommendations.

Figure 1:
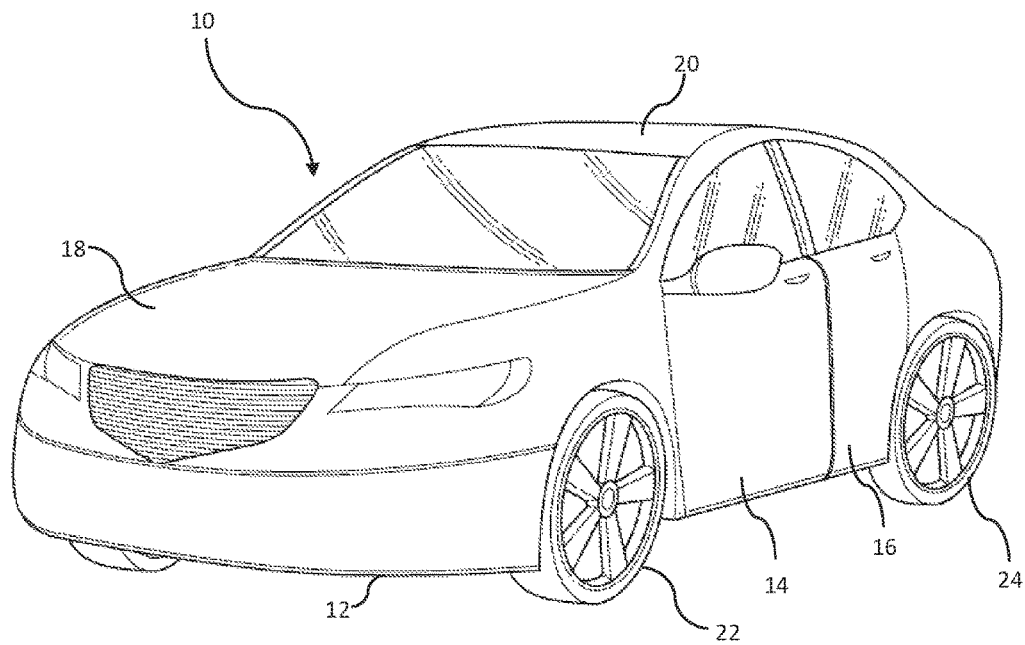
FIG. 1 is a perspective view of an exemplary vehicle.

FIG. 1 shows a perspective view of an embodiment of an exemplary vehicle 10 in accordance with the principles of the disclosed subject matter. The vehicle 10 can include a body 12, front doors 14, rear doors 16, hood 18, roof 20, front wheels 22 and rear wheels 24. Embodiments of the exemplary vehicle may include any number of doors such as one, two, three, four, five, etc. and any number of wheels such as two, three, four, five, etc.

Figure 2:
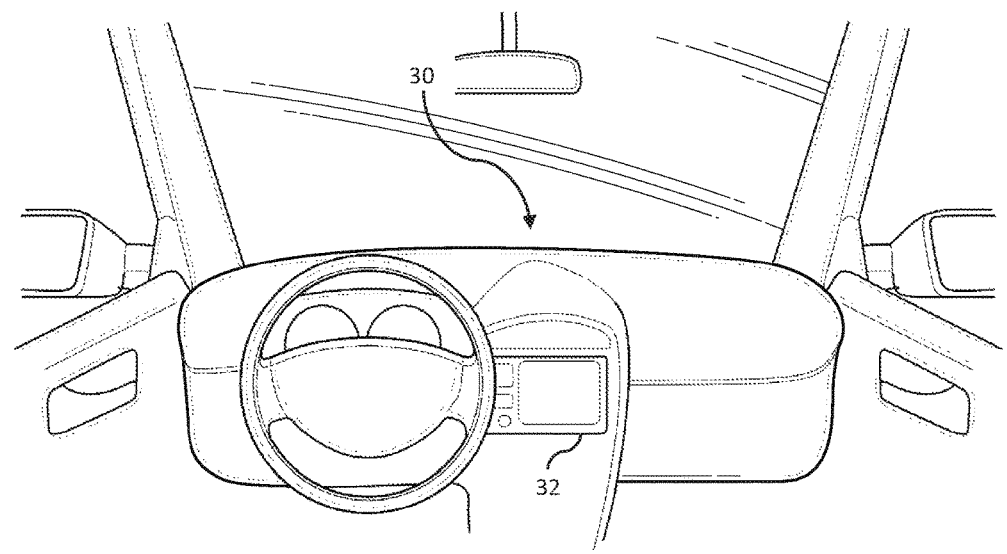
FIG. 2 is a perspective view of a dashboard of the exemplary vehicle.

FIG. 2 shows a perspective view of an interior of the vehicle 10 including a dashboard 30 having a display 32. As described below, the display 32 can be configured to display various messages relating to the teaching and coaching operations of the system 50.

I. System

Figure 3:
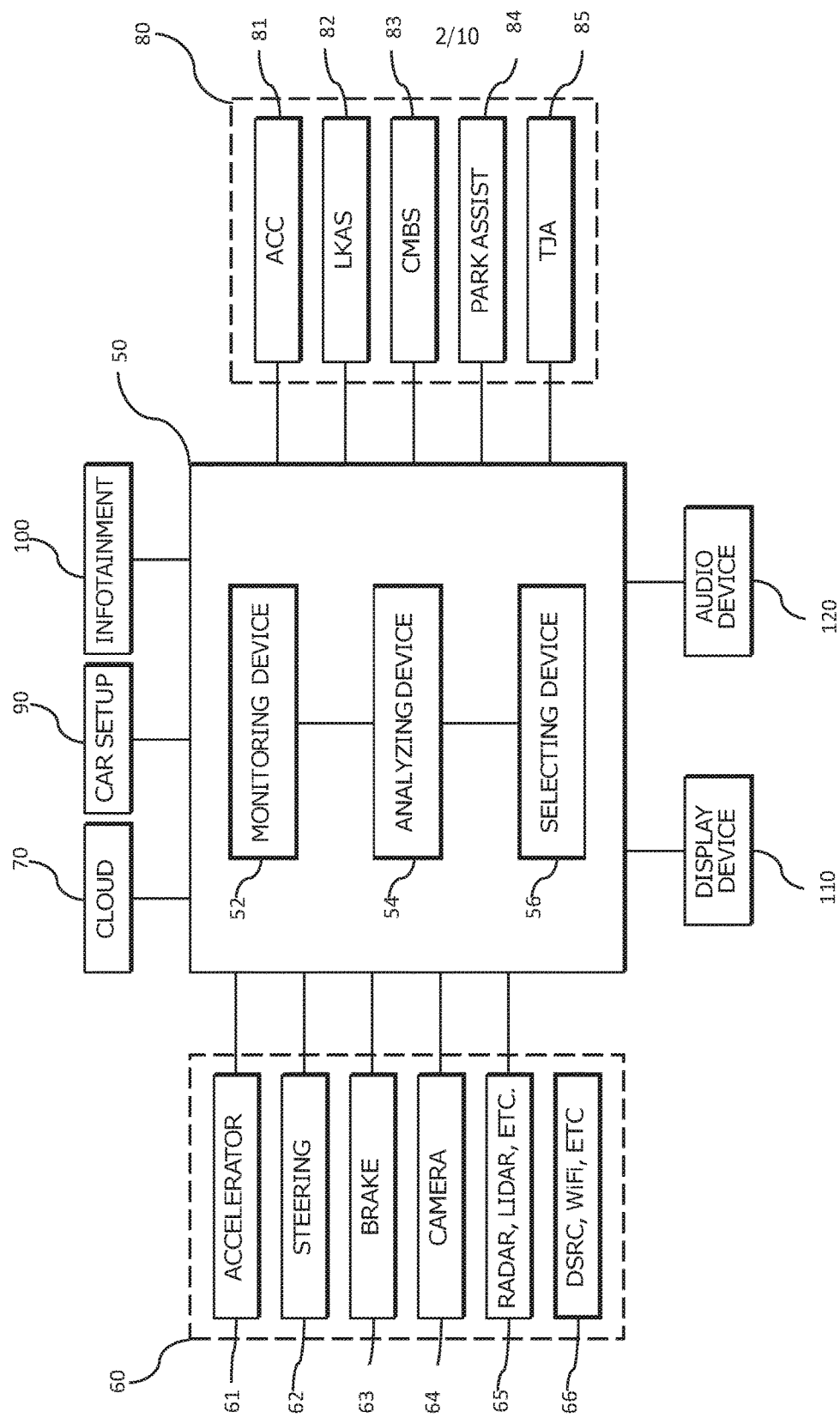
FIG. 3 is a schematic representation of a teaching and coaching algorithm of an information providing system in accordance with the disclosed subject matter.

The information providing system 50 of the present embodiment shown in FIG. 3 is configured to include a monitoring device 52, an analyzing device 54 and a selecting device 56. The monitoring device 52, analyzing device 54 and selecting device 56 can be connected to each other to send signals via one-way communication lines or two-way communication lines. Specifically, the monitoring device 52 can be connected to the analyzing device 54 and the analyzing device 54 can be connected to the selecting device. Alternatively, each of the devices 52,54,56 can be connected to a central hub for sending and receiving signals to each other.

As described in detail below, the monitoring device 52 is configured to receive signals from information sources 60 and send signals to the analyzing device 54, which in turn is configured to send signals to the selecting device 56. The selecting device 56 is configured to send signals to a display device 70.

Presently, the information sources 60 can be vehicle sensors such as those integrated with vehicle hardware such as an accelerator (i.e., gas pedal) 61, a steering mechanism 62, brakes 63, cameras (i.e., forward facing, side view, rearview, etc.) 64, radar/lidar 65, dedicated short range communication (DSRC) and WiFi systems 66, etc. Furthermore, beyond the above described input sources, the information providing system 50 can be configured for use with any other information source that can be used to assess traffic, environment, etc.

The information providing system 50 can further receive communication signals from an automatic/automated driver assist system (ADAS) 80 such as adaptive cruise control (ACC) 81, lane keeping assist system (LKAS) 82, park assist 84, collision mitigation braking system (CMBS) 83, traffic jam assist (TJA) 85, etc.

The information providing system 50 can also receive communication signals from cloud data sources 70 such as function usage from other drives, mobile applications (i.e., Waze, Google Maps, Apple Maps, etc.). It is intended that function usage from other drives may be derived from an online service that collects information about functionalities that different drivers are using relating to vehicles that are connected to the internet. For example, the service can determine locations where drivers are typically using a lane keeping assist system (LKAS), what kind of features are commonly used, etc.

The information providing system 50 can additionally receive communication signals from car setup functions 90 such as door access, lighting, seats, etc., as well as infotainment systems 100 such as navigation, phone pairing, etc.). Other embodiments of the information providing system 50 may yet be configured to receive communication signals from any other car function of interest. Presently, the monitoring device 52, analyzing device 54 and selecting device 56 may be comprised as a computer processor configured to execute an algorithm that monitors, analyzes, and selects.

In the present embodiment, display and audio devices 110,120 can also be configured to be in communication with the information providing system 50 so as to be able to send and receive signals from each other.

The monitoring device 52 of the present information providing system 50 can be configured to collect, distill and categorize data. Initially, the monitoring device 52 can obtain driving environment, traffic conditions and road type during each trip based on a car's local sensors, GPS, cloud-based data, etc. The monitoring device 52 can further obtain prominent driver's habits, patterns and function usage of a host (primary) driver. If available, the same information about other drivers can be obtained from the cloud service. All of this info will be used to populate predetermined driver behavior and driving pattern data for use with the information providing system 50, as described in detail below. The information from the monitoring device 52 can also be used to add additional (dynamic) information to the ADAS systems reference list based on the data collected from other drivers, as shown in FIG. 3 by the communication line connecting the information providing system 50 and the ADAS 80.

Figure 4:
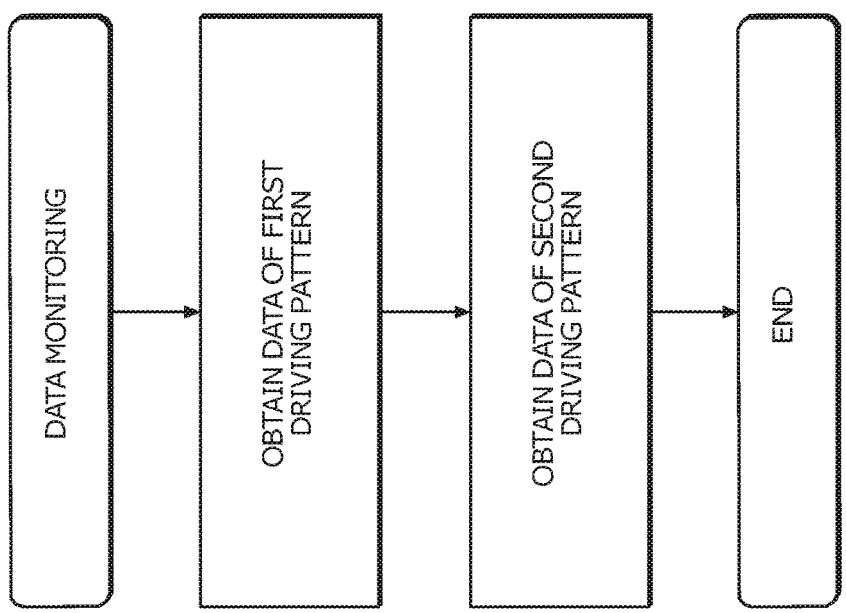
FIG. 4 is a process diagram of gathering data for the information providing system, specifically the monitoring device, in accordance with the disclosed principles.

FIG. 4—As described below, the monitoring device 52 can be configured to obtain data of a first driving pattern such as types of roads a driver is driving on, traffic conditions, how/when/where a driver is operating different functions in the car, etc. The monitoring device 62 can also be configured to obtain data of a second driving pattern such as history of function usage.

FIG. 5 illustrates a table of exemplary first driving patterns. As shown in the table, the predetermined (actual) driving behavior of driving on a highway occurred on days 1, 2 and 3, while parking in a narrow spot occurred on just days 2 and 3, and unlocking all doors by pressing remote unlock button twice occurred on just day 2. Based on the table, the first driving pattern can be established as a driver using a highway above a threshold frequency, such as three days per week on average. The threshold can be a predefined number, but it can be dynamically calculated based on various data that is collected. The threshold can be obtained using some sort of artificial intelligence (AI), machine learning, cloud computing, statistics algorithm, etc. The driving behavior the monitoring device 52 tracks for establishing the first driving pattern can be predetermined and can be added later.

FIG. 6 illustrates a table of exemplary second driving patterns. As shown in the table, the LKAS was never used before while the ACC and PARK ASSIST was last used today. Based on the table, the second driving pattern can be established as a driver not using LKAS but having used ACC and PARK ASSIST before. The driving behavior the monitoring device 52 tracks for establishing the second driving pattern can be predetermined and can be added later.

Figure 7:
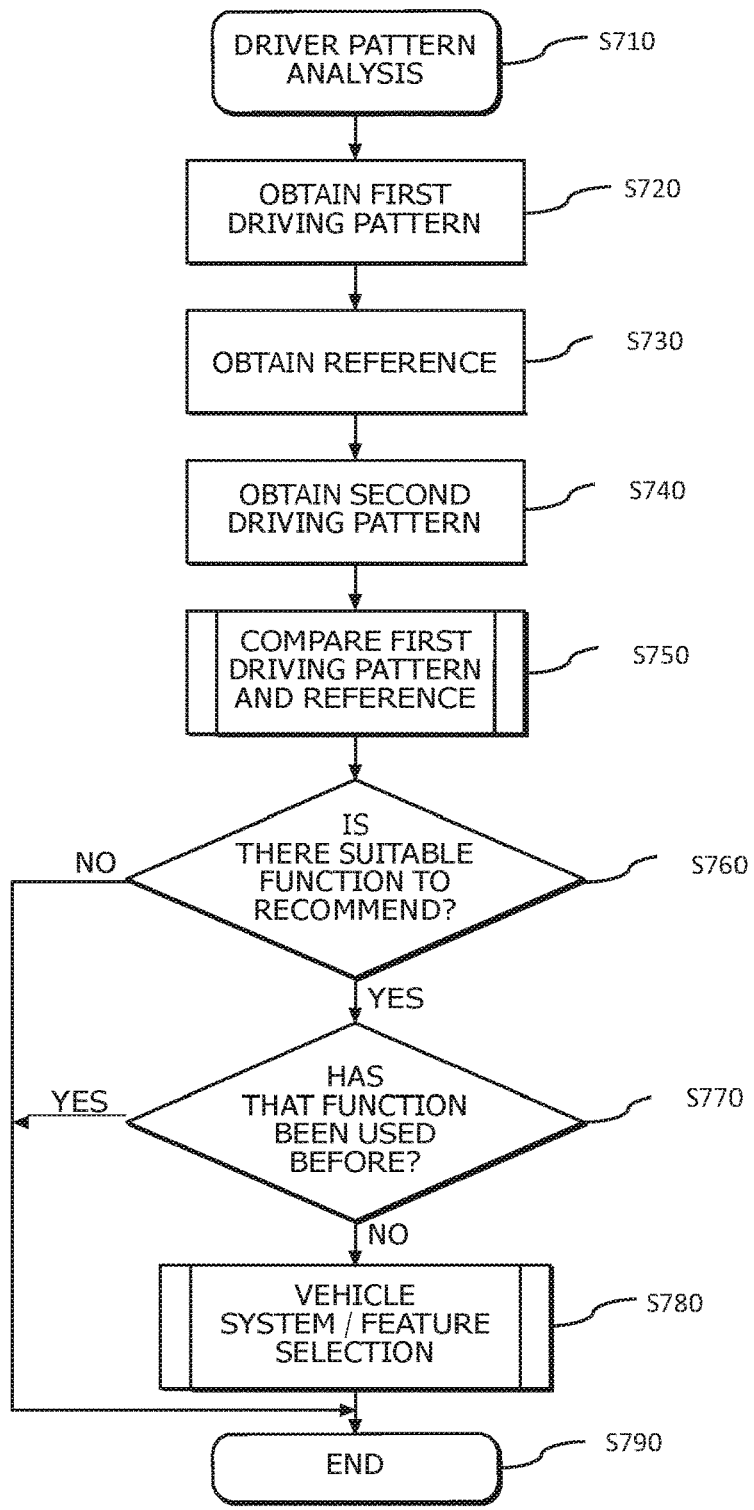
FIG. 7 is an exemplary process diagram of an algorithm for the information providing system.

FIG. 7 illustrates an exemplary process diagram of an algorithm for the information providing system 50. More specifically, S710 through S770 can be implemented by the analyzing device 54 and S780 can be implemented by the selecting device 56. The system 50 begins with driver pattern analysis at S710. The system 50 initially obtains/accesses a first driving pattern (see FIG. 5) at S720 and then obtains a reference at S730, which is described later (See FIG. 8). The system 50 then obtains/accesses a second driving pattern (see FIG. 6) at S740 and compares the first driving pattern and the reference at S750. The system 50 subsequently determines if there is a suitable function to recommend at S760. If there is no suitable function, the process ends at S790. However, if there is a suitable function, the system 50 determines whether or not that function has been used before at S770. If the function has been used before, the process ends at S790. However, if the function has not been used before, the system 50 provides the driver with system/feature selection (see FIG. 11) at S780 and then ends the process at S790.

FIG. 8 illustrates a table showing an example of the reference. For example, the table in FIG. 8 lists predetermined (actual) driving behavior of driving on a highway, parking in a narrow spot, and unlocking all doors by pressing remote unlock button twice. The table also shows that LKAS and ACC are listed as "suitable" for the predetermined (actual) driving behavior of driving on a highway because LKAS and ACC may be of interest and suitable to recommend to the driver based on the driver's first habit (see FIG. 5 pertaining to driving on a highway). Alternatively, the table shows that parking assist is listed as "suitable" for parking in a narrow spot, and unlocking all doors by pressing unlock button once is "suitable" for predetermined behavior of unlocking all doors by pressing remote unlock button twice. The example regarding single-click door unlocking yields a potential for simplification in vehicle operation and functions. Some other information of the reference, such as cloud-based, can be obtained from the monitoring device 52 and added after a certain period of time. For example, if the cloud 70 collects information from other drivers and finds out that the other drivers tend to use CMBS 83 and TJA 85 in downtown area (third driving behavior), the system 50 receives from the cloud 70 the information and adds the information to the reference. More specifically, the system 50 adds to the reference the information "CMBS 83 and TJA 85 are suitable functionalities to recommend to the driver when the driver drives in downtown area. In that case, the monitoring device 52 can track if the driver drives in downtown area frequently (first driving pattern) and if the driver has used CMBS 83 or TJA 85 before (second driving pattern) as the reference changes. Other entries can be predefined ahead of time based on the functions the vehicle contains.

In step 750 and S760, the system 50 finds any suitable functionalities to recommend to the driver by comparing the first driving pattern with the reference. For example, the first driving pattern is established as a driver using a highway by the monitoring device 52 (See FIG. 5), so the system 50 can determine that suitable functionality can be LKAS 82 and ACC 81 by reference to the reference shown in FIG. 8. If the monitoring device 52 determines that another first driving pattern is "Parking in a narrow parking spot", for example, the system 50 can determine that suitable functionality can be "park assist 84" by reference to the reference shown in FIG. 8. In step 770, the system 50 determines if the suitable functionalities have been used by the driver before. For example, the system 50 can determine that ACC 82 and Park Assist 84 have already been used by the driver before, while LKAS 82 has not been used by the driver before. In step 780, the system 50 selects which functionality should be recommended to the driver. For example, LKAS 82 can be selected because the driver drives on highway frequently (first driving pattern) and the driver has never used LKAS before (second driving pattern).

Another example is setting up vehicle settings, such as door unlock mode. Drivers typically unlock all doors by pressing the unlock button on the remote control twice. Exemplary vehicles can have a function that allows achieving the same result by pressing the button only once. In this case, if the system 50 observes the trend that the driver is always unlocking all doors by double-pressing the unlock button on the remote, it can suggest a simpler way to do that. This detection can be done at the car level, but also cloud information obtained from other drivers can provide additional insight how various things can be achieved in simpler ways.

Figure 9:
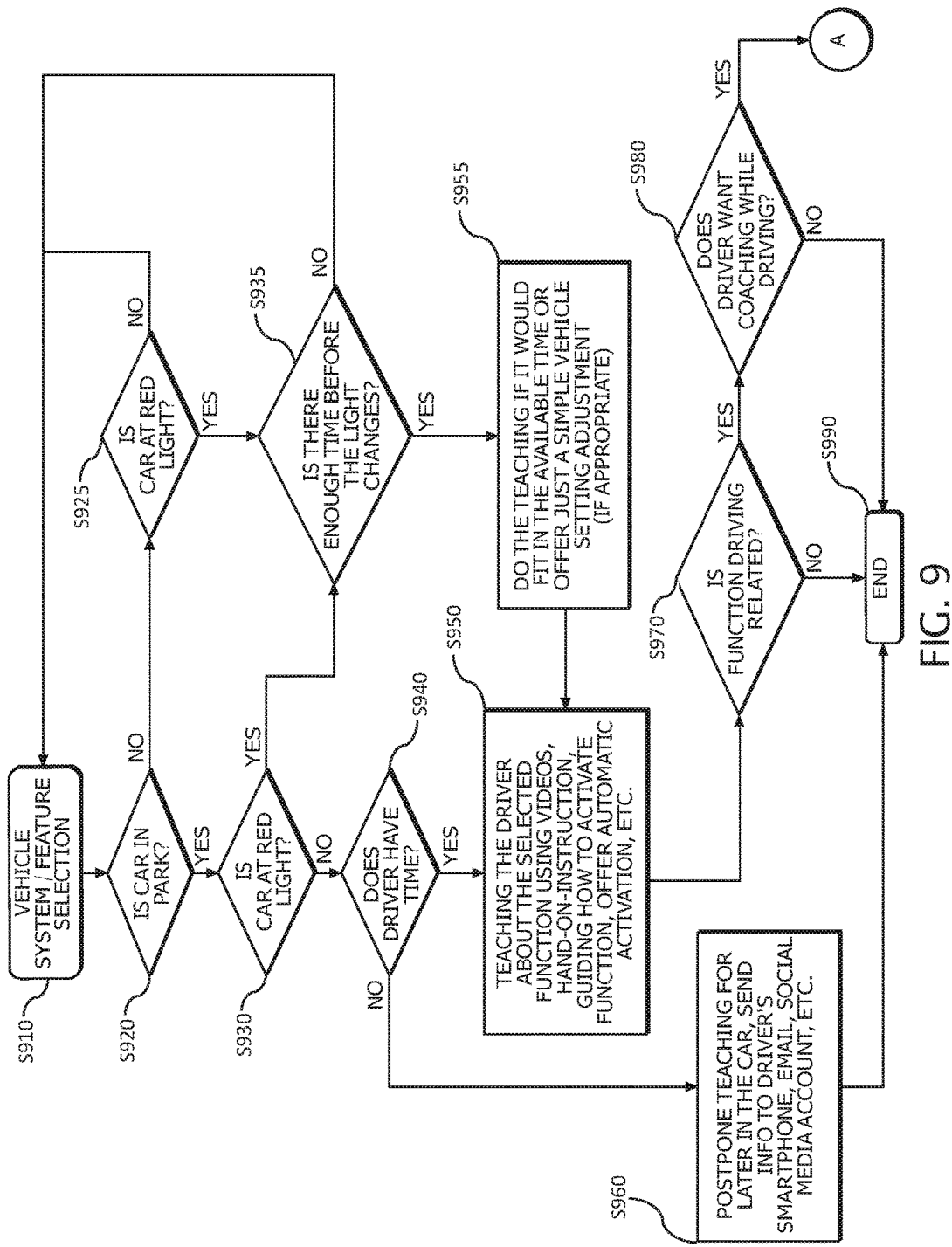
FIG. 9 is an exemplary process diagram of an algorithm of the information providing system, specifically pertaining to the selecting device, in accordance with the disclosed principles.

FIG. 9 illustrates an exemplary process diagram of an algorithm of the information providing system 50, specifically pertaining to the selecting device 56, in accordance with the disclosed principles. Specifically, FIG. 9 illustrates a process pertaining to the selecting device 56. The process begins with the vehicle system/feature selection at S910 and proceeds to inquiring whether or not the car is in park at S920. Whether the car is parked or not can be detected based on whether its parking break is activated or a gear shift is at P range position.

If the car is not in park, the system 50 determines whether the car is at a red light at S925. Whether the car is at red light or not can be determined by an on-board camera or communicating with a traffic right. If the car is also not at a red light, the system 50 returns to the starting vehicle system/ feature selection at S910. If the car is at a red light, the system 50 determines if there is enough time to provide information to the user before the light changes at S935. Whether there is enough time or not can be determined by comparing the time before the red light changes, such as to blue, with a predetermined time period left, such as 30 seconds. The time before the red light changes to blue can be detected by communicating with the traffic light. If there is not enough time before the light changes to provide the user with information, the system 50 returns to the starting vehicle system/feature selection at S910. If, however, there is enough time to provide information, the system 50 performs the teaching if it would fit in the available time or offer just a simple vehicle setting adjustment (i.e., if appropriate) at S955. If there are two or more functionalities at the time of the red light or other brief stop without activating a parking brake, the system 50 can only provide information about the functionality that needs less time to teach than the other functionalities at that time. And the other functionalities can be taught during next red light stop or other brief stop without activating the parking brake. The system 50 thus proceeds to teaching the driver about the selected function using videos, hand-on-instruction, guiding how to activate function, offer automatic activation, etc. at S950. This teaching can be done by the display device 110 or audio device 120 or the combination thereof. Further the teaching can be done by a driver's mobile device such as smart phone which is connected to the system 50 through a wireless network such as Bluetooth. Further the teaching can be done by the system 50 sending the information to a server and then the driver can access it to watch the teaching on his personal computer via the internet. Subsequently, the system 50 proceeds to A, shown in FIG. 10.

Alternatively, if the car is determined to be in park, the system 50 still proceeds to determine whether the car is at a red light at S930. If the car is at a red light, the system 50 determines if there is enough time to provide information to the user before the light changes at S935. If there is not enough time before the light changes to provide the user with information, the system 50 returns to the starting vehicle system/feature selection at S910. If, however, there is enough time to provide information, the system 50 performs the teaching if it would fit in the available time or offer just a simple vehicle setting adjustment (i.e., if appropriate). The system 50 thus proceeds to teaching the driver about the selected function using videos, hand-on-instruction, guiding how to activate function, offer automatic activation, etc. at S950. Subsequently, the system 50 proceeds to A, shown in FIG. 10.

Furthermore, if the car is in park and not at a red light, the system 50 determines whether the driver has time to engage in a teaching at S940. Whether the driver has time or not can be detected by having the driver press "YES" button on the display after the system 50 asks the driver if he/she has time on the display. If the driver selects "NO" button or ignores, the system can determine the driver does not have time. If there is enough time to provide information, the system 50 performs the teaching if it would fit in the available time or offer just a simple vehicle setting adjustment (i.e., if appropriate). The system 50 thus proceeds to teaching the driver about the selected function using videos, hand-on-instruction, guiding how to activate function, offer automatic activation, etc. at S950. Subsequently, the system 50 proceeds to A, shown in FIG. 10.

However, if there is not enough time to engage in a teaching, the system 50 postpones the teaching for later, either in the car or by sending info to the driver's smartphone, email, social media account, etc. The system 50 subsequently ends the process at S990.

Figure 10:
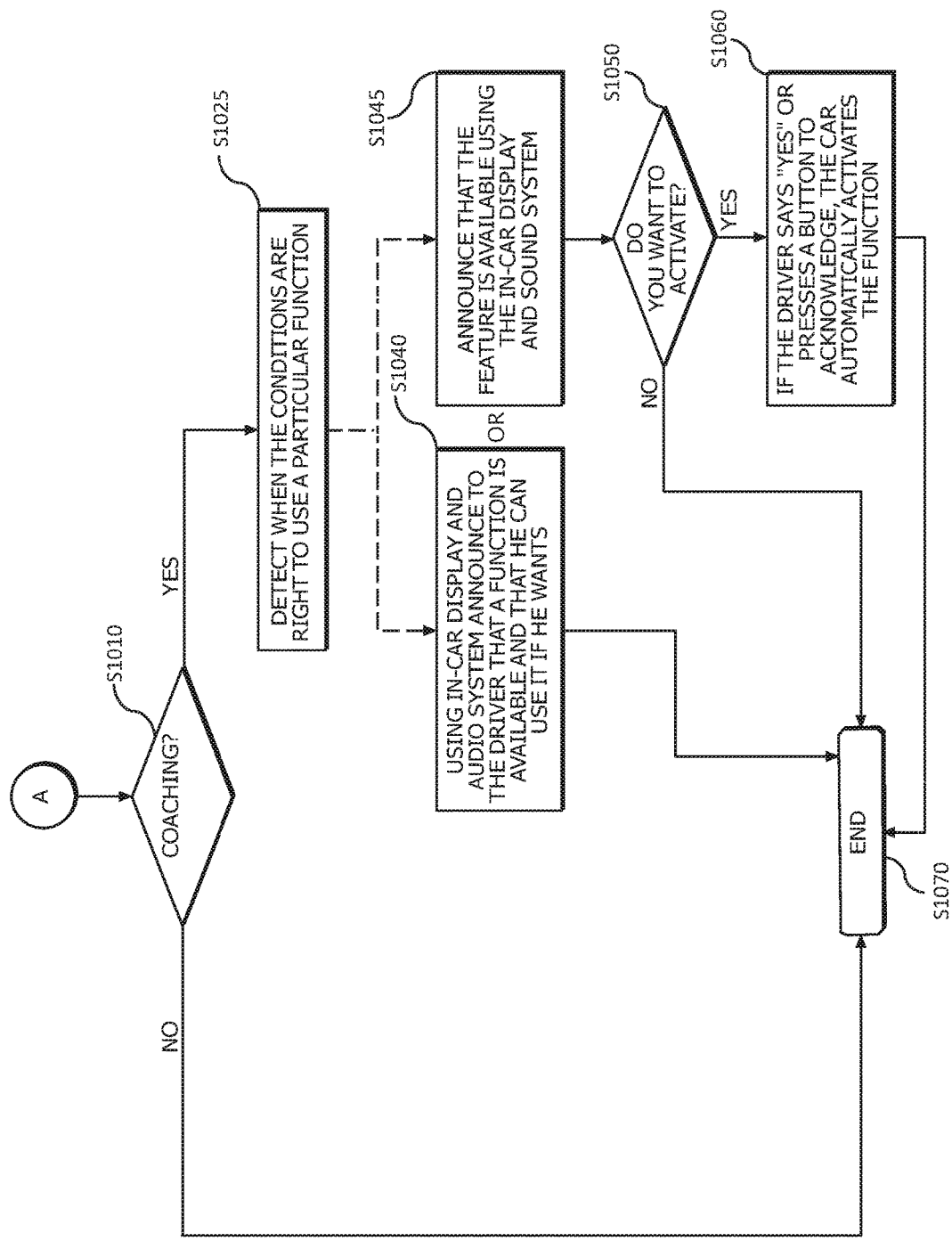
FIG. 10 is a process diagram of portion A of an algorithm of the information providing system, specifically pertaining to the selecting device, in accordance with the disclosed principles.

FIG. 10 illustrates portion A of an exemplary process diagram of an algorithm of the information providing system 50, specifically pertaining to the selecting device 56, in accordance with the disclosed principles. After teaching the driver about the selected function, the system 50 determines whether to coach the driver/user or not at S1010. If the driver does not need coaching, the system 50 ends the sub routine portion A at S 1070.

If the system 50 determines that the driver should receive coaching, the system 50 then detects when the conditions are right to use a particular function at S1025. The system can determine when the conditions are right to use a particular function based on where the car is. For example, when the system 50 is trying to coach the driver about LKAS, the system 50 can coach the driver when the car is on highway. The system 50 subsequently has two options: the system 50 can either (1) tell the driver that a function is available and that the driver can use it if they want to at S1040, or (2) tell the driver that a function is available and that the system can activate it if they want to at S1045. Should the system 50 proceed to tell the driver that a function is available and that the driver can use it if they want to at S1040, the sub-routine process will subsequently end at S1070. If, on the other hand, the system 50 proceeds to tell the driver that a function is available and that the system can activate it if they want to at S1045, the system 50 can prompt the driver if they want to activate the feature at S1050. If the user does not want to activate the feature, the sub-routine process will subsequently end at S1070. Alternatively, if the user does want to activate the feature, the driver can say "YES" or press a button to acknowledge activation, the car automatically activates the function at S1060 before the sub-routine proceeds to end at S1070

After progressing through the portion A of the exemplary process illustrated in FIG. 10, the system 50 proceeds to determine whether the function is driving related at S970 as shown in FIG. 9. If the function is not driving related, the system 50 ends the process at S990. If, however, the function is driving related, the system 50 determines if the driver wants coaching while driving at S980. If the driver does not want coaching while driving, the system 50 ends the process at S990. Alternatively, if the driver does want coaching while driving, the system 50 again returns to portion A of the exemplary process shown in FIG. 10 and proceeds through the steps shown.

Figure 11:
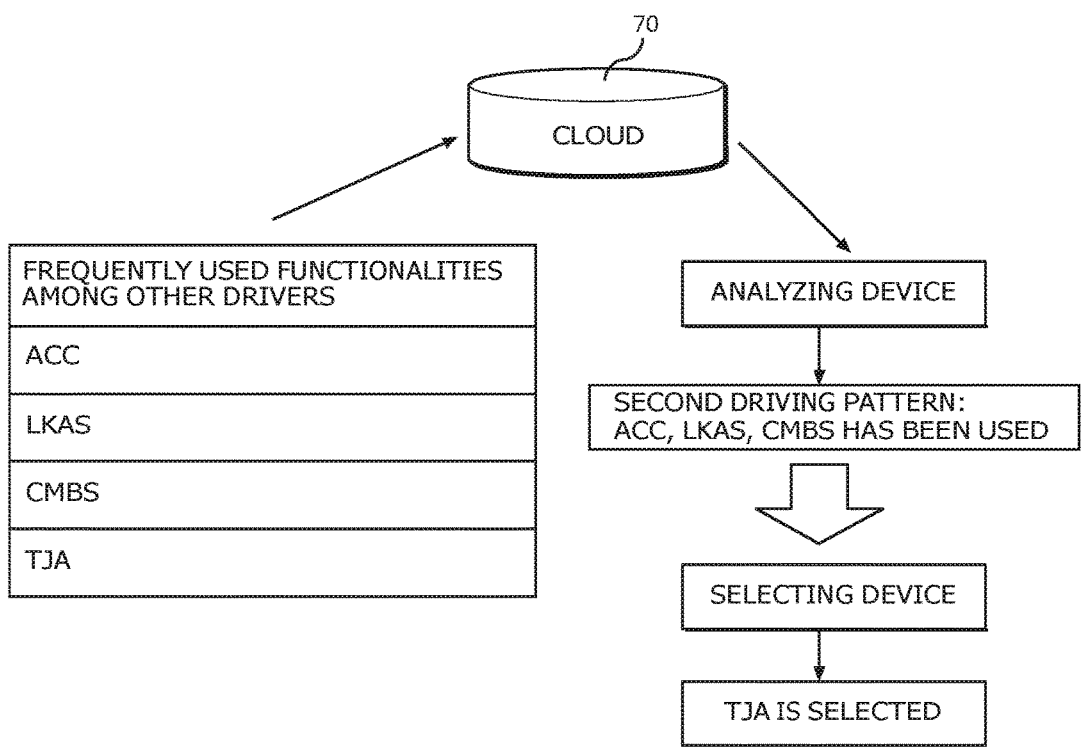
FIG. 11 is a schematic representation of a relationship between exemplary functions and components of the information providing system in accordance with the disclosed principles.

FIG. 11 illustrates a relationship between exemplary functions and components of the information providing system 50 in accordance with the disclosed principles. As shown in FIG. 11, frequently used functionalities among other drivers, (i.e., ACC, LKAS, CMBS, TJA, etc.) can be stored on the cloud 70 to be accessed by the analyzing device 54. The analyzing device 54 can then signal to the selecting device 56 second driving pattern(s) of whether or not certain functions have been used (i.e., ACC, LKAS, CMBS, TJA, etc.). A function, for example TJA, can then be selected. Until the first driving pattern is determined, the selecting device can select a functionality among preselected functionalities stored on board or frequently used functionalities (among other drivers) stored on the cloud 70. In this case, the system 50 can only compare the preselected functionalities stored on board or the frequently used functionalities among other drivers with the second driving pattern without comparing with the first driving pattern. This allows less frequent drivers to receive useful information, because it might take some time for the less frequent drivers to determine the first driving pattern of the system 50.

FIGS. 12A-C show tables demonstrating individual driving pattern information for different users. The monitoring device can collect the individual driving pattern information by each driver who uses the same vehicle by recognizing each driver with on-board camera or by another identification method.

FIG. 12A shows a table demonstrating individual driving pattern information for User A. As shown, User A drove on a highway on three days, parked in a narrow spot on two days, and unlocked all doors by pressing remote unlock button twice on one day in the record.

FIG. 12B shows a table demonstrating individual driving pattern information for User B. As shown, User B did not drive on a highway at all during the three recorded days, but parked in a narrow spot on all three recorded days. User B also did not unlock all doors by pressing remote unlock button at all during the three recorded days.

FIG. 12C shows a table demonstrating individual driving pattern information for User C. As shown, User C did not drive on a highway on all three recorded days, nor did they park in a narrow spot on the recorded days. However, User C did unlock all doors by pressing remote unlock button all three days on record.

II. Additional Considerations

If the driver has no time for teaching at the moment, the system 50 can postpone teaching to later in the car, send a reminder/link to videos/materials, etc. to their smart phone/ social network account, etc., or do the teaching on their mobile device such as smart phone. On the other hand, the system 50 can teach the driver in the car. The car can show the videos that explain how particular features work. The car can even play the sounds, show visual icons, etc. that different systems produce when used in reality. This would help the drivers create a mental image of what to expect when using the systems. This way the systems are demonstrated to the drivers in the car by the car.

The teaching should be conducted whenever it is safe to do so (when the driver is stopped, preferably while in park, but this can also be adjusted based on the complexity of the feature). Possibilities: when the driver enters the vehicle, when the driver arrives at his/her destination, when the driver is waiting at a traffic light (the system 50 can use the information about the light timing and based on that judge if there may be time for a quick teaching or for adjusting a simple feature in the car—such as door unlock mode, etc.), or when a long idle in park is detected.

The following exemplary phrases may be how the system 50 communicates to the driver if he/she wants to learn something when waiting on a red light or in a similar situation: "We noticed you are standing. Would you like to learn some useful information about your car?"; or "We noticed you are standing. Would you like a tip-of-the-day about your car?". Additional phrases may also be implemented to communicate to the driver.

Regarding coaching, the car can suggest (coach) when a particular feature is available either while driving or while standing (based on the suitability of the feature). The feature can then be activated as follows: after receiving a suggestion, driver activates the feature manually; or the car suggests the feature that is available in a particular situation and asks the driver if he/she wants it active (the driver can then respond with simple voice command such as "Yes", or with a simple press of a single button for confirmation).

The system can also be configured to contemplate what to do if a driver changes to a different car. The information that the system has already collected about the driver, functions he/she is using, habits, etc. can be transferred from one car to another by a system of an old car sending the information to the cloud and receiving the information from the cloud by a system of a new car (for example, driver purchased a new car, so there is no need to teach something he/she had already used or knows). Alternatively, the teaching can still be performed if the feature has changed significantly since the previous car model.

III. Alternative Embodiments

While certain embodiments of the invention are described above, and FIGS. 1-12C disclose the best mode for practicing the various inventive aspects, it should be understood that the invention can be embodied and configured in many different ways without departing from the spirit and scope of the invention.

For example, embodiments are disclosed above in the context of an information providing system, specifically driver teaching and coaching system, configured for a vehicle as shown in FIG. 1. However, embodiments are intended to include or otherwise cover information providing systems configured for any type of vehicle.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the information providing system disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An information providing system for a vehicle that is operable by a driver capable of exhibiting driving behavior, the driving behavior being a recorded frequency of occurrences, the system comprising:
   a processor configured to:
   obtain a first driving pattern from the driving behavior, the first driving pattern being specified when the same driving behavior is repeated above a threshold frequency;
   select at least one functionality based on the first driving pattern obtained; and
   prompt the driver for teaching relating to the at least one functionality selected by the processor by presenting information on the at least one functionality prior to enablement thereof,
   wherein the processor records the driving behavior on a daily basis, and the first driving pattern is specified when the same driving behavior is repeated more than a predetermined number of days in a certain period of time.

2. The information providing system according to claim 1, wherein the processor obtains a second driving pattern, the second driving pattern is about whether the driver has used the function before or not, and the processor selects the functionality based on the second driving pattern.

3. The information providing system according to claim 1, wherein the processor selects the functionality from preselected functionalities or the functionalities other driver uses until the first driving pattern is determined.

4. The information providing system according to claim 3, wherein the processor obtains a second driving pattern, and the second driving pattern is about whether the driver has used the functionality before or not, and the processor selects the functionality based on the second driving pattern.

5. The information providing system according to claim 1, wherein the processor obtains the driving behavior to specify the first driving pattern with respect to each driver who uses same vehicle.

6. The information providing system according to claim 1, wherein the processor has a list of predetermined driving patterns to compare with the driving behavior, and the a new predetermined driving pattern is added to the list in response to detecting a third driving pattern from another driver's driving behavior.

7. The information providing system according to claim 1, wherein the processor asks the driver if the processor can show the driver functionality on a display, and upon being declined, the processor sends the information about the functionality to a mobile device or server having an internet connection.

8. The information providing system according to claim 1, wherein the at least one functionality includes a first functionality and a second functionality, and the processor prompts the driver for teaching relating to the second functionality for a predetermined amount of time to show the driver an explanation thereof that is shorter than a predetermined amount of time that the processor prompts the driver for teaching relating to the first functionality for, and the processor shows only the explanation of the second functionality when the vehicle comes to a stop.

9. The information providing system according to claim 1, wherein the processor reminds the driver of the functionality if the vehicle comes to a situation suitable to use the functionality while driving, after the processor prompts the driver for teaching relating to the at least one functionality.

10. A method of providing information for a vehicle that is operable by a driver capable of exhibiting driving behavior, the driving behavior being a recorded frequency of occurrences, the method comprising:

obtaining a first driving pattern from the driving behavior, the first driving pattern being specified when the same driving behavior is repeated above a threshold frequency;

selecting at least one functionality based on the first driving pattern; and prompting the driver for teaching relating to the at least one functionality by presenting information on the at least one functionality prior to enablement thereof, wherein obtaining the first driving pattern from the driving behavior occurs on a daily basis, and the first driving pattern is specified when the same driving behavior is repeated more than a predetermined number of days in a certain period of time.

11. The method according to claim 10, further comprising obtaining a second driving pattern, the second driving pattern is about whether the driver has used the function before or not, and the functionality is selected based on the second driving pattern.

12. The method according to claim 10, wherein selecting at least one functionality based on the first driving pattern selects the functionality from preselected functionalities or the functionalities other driver uses until the first driving pattern is determined.

13. The method according to claim 12, further comprising obtaining a second driving pattern, and the second driving pattern is about whether the driver has used the functionality before or not, and the functionality is selected based on the second driving pattern.

14. The method according to claim 10, wherein obtaining a first driving pattern from a driving behavior specifies the first driving pattern with respect to each driver who uses same vehicle.

15. The method according to claim 10, wherein obtaining a first driving pattern from a driving behavior includes comparing a list of predetermined driving patterns with the driving behavior, and a new predetermined driving pattern is added to the list in response to detecting a third driving pattern from another driver's driving behavior.

16. The method according to claim 10, wherein prompting the driver for teaching relating to the at least one functionality includes asking the driver if a display can show the driver functionality, and when declined, sending the information about the functionality to the driver's mobile device or server on the internet.

17. The method according to claim 10, wherein the at least one functionality includes a first functionality and a second functionality, and prompting the driver for teaching relating to the at least one functionality includes prompting the driver for teaching relating to the second functionality for a predetermined amount of time to show the driver an explanation thereof that is shorter than a predetermined amount of time that the first functionality is prompted for teaching, and information on only the second functionality is presented when the vehicle comes to a stop.

18. A method of providing information for a vehicle that is operable by a driver capable of exhibiting driving behavior, the driving behavior being a recorded frequency of occurrences, the method comprising:

obtaining a first driving pattern from the driving behavior, the first driving pattern being specified when the same driving behavior is repeated above a threshold frequency;

selecting at least one functionality based on the first driving pattern; and prompting the driver for teaching relating to the at least one functionality by presenting information on the at least one functionality prior to enablement thereof, wherein prompting the driver for teaching relating to the functionality includes reminding the driver of the functionality if the vehicle comes to a situation suitable to use the functionality while driving, after the functionality is recommended.

19. The information providing system according to claim 1, wherein the processor prompts the driver for teaching relating to the at least one functionality selected by the processor only when the vehicle comes to a stop.

20. The information providing system according to claim 19, wherein the processor prompts the driver for teaching relating to the at least one functionality selected by the processor for a predetermined amount of time.

21. The information providing system according to claim 20, wherein the processor stops prompting the driver for teaching relating to the at least one functionality selected by the processor upon expiration of the predetermined amount of time.

22. The information providing system according to claim 20, wherein the processor stops prompting the driver for teaching relating to the at least one functionality selected by the processor upon initiating movement of the vehicle.

23. The method according to claim 10, wherein prompting the driver for teaching relating to the functionality only occurs when the vehicle comes to a stop.

24. The method according to claim 23, wherein prompting the driver for teaching relating to the functionality only occurs for a predetermined amount of time.

25. The method according to claim 24, wherein prompting the driver for teaching relating to the functionality ceases upon expiration of the predetermined amount of time.

26. The method according to claim 24, wherein prompting the driver for teaching relating to the functionality ceases upon initiating movement of the vehicle.

* * * * *